Dec. 24, 1940.  J. BETHENOD  2,226,154
ALTERNATING CURRENT HIGH TENSION CABLE SYSTEM
Filed Jan. 14, 1938
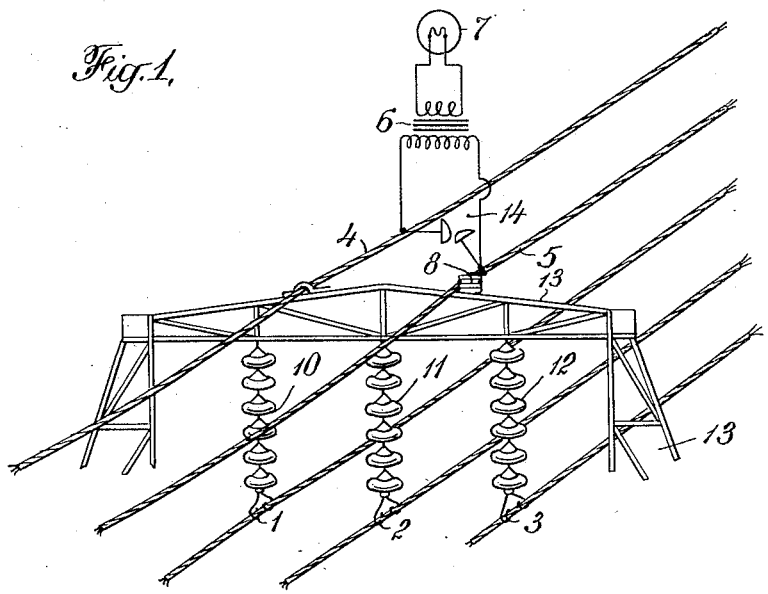
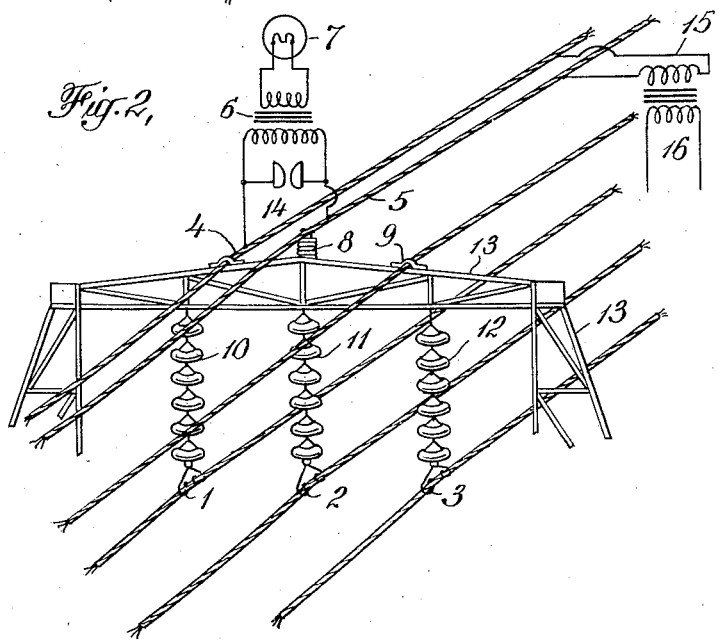
INVENTOR
Joseph Bethenod
BY
ATTORNEYS Patented Dec. 24, 1940

2,226,154

UNITED STATES PATENT OFFICE 2,226,154

ALTERNATING CURRENT HIGH TENSION CABLE SYSTEM

Joseph Bethenod, Paris, France, assignor to Société Anonyme pour les Applications de l'Electricité & des Gaz Rares, Etablissements Claude-Paz & Silva, Paris, France Application January 14, 1938, Serial No. 184,924
In Germany February 12, 1937

1 Claim. (Cl. 177—352)

The present invention relates to an arrangement for electric overhead high tension alternating current cables and has for its principal object the provision of means for protecting the cables against atmospheric discharges, lightning etc., whilst allowing the current to be used, for example for electric warning or beacon lamps or discharge tubes without in any way interfering with the protection of the cables.

It is known to arrange parallel with the high tension electric cables an auxiliary cable which feeds the current consuming apparatus inserted between the auxiliary cable and a point which is at earth potential.

The invention aims at utilising the auxiliary cables for the protection of the high tension cables and is characterised in that this auxiliary cable is located above the high tension conductors, and permanently connected to earth so as to play the part of a Faraday cage for the said conductors.

Consequently in order to do this, insulators are placed, for example, near the top of the pylons which support the high tension conductors, on which insulators is supported a cable parallel to the high tension conductors. This cable is then connected to the current consuming apparatus, which latter are in turn connected to earth. Finally a voltage limiting device, constituted for example by lightning arresters, is interposed between this cable and earth.

In the case of existing electric high tension cable systems which comprise, for the protection of these cables against electrical discharges, auxiliary earthed cables arranged upon the same pylons as the high tension cables, it will be found convenient to use as the auxiliary cable according to the present invention, one of the auxiliary cables in question, it being sufficient to provide the same with appropriate insulators. Further, one of the remaining auxiliary cables when earthed will serve as an earth for the mounting of the current consuming apparatus and simultaneously for the mounting of the lighting conductor mentioned above.

The attached drawing comprising Figures 1 and 2 shows by way of example two embodiments of the present invention.

In these figures, 1, 2 and 3 are the conductors of a three-phase cable system suspended from the chains of insulators 10, 11, 12, which are supported by pylons, such as 13. The current consuming apparatus comprises, for example, sources of light 7, fed through transformers 6.

In Figure 1, use is made of the auxiliary cable 5 which is placed above the conductors 1, 2 and 3 and is supported on insulators 8, and of the earthed auxiliary cable 4.

As is well known, the electrostatic induction arising from the conductors 1, 2 and 3, generates between the cables 4 and 5 a certain difference in potential which is applied to the primary of the transformer 6, which latter allows of feeding at the most convenient voltage the lighting apparatus 7, which may, for example, comprise luminous tubes intended for warning lights. To do this it will usually be found advantageous to utilise for the transformer 6 a transformer having artificially increased magnetic leakages so as to obtain an effect of resonance with the mutual capacities which exist between the cables themselves and between these cables and earth.

As is known the same effect can be obtained by means of an additional self inductance coil, which is not shown in the drawing.

In any case, owing to the relatively low reactance of the primary windings of the transformers 6, the cable 5 retains its role as a screen as regards the static charges which slowly leak to earth. Even in the case of rapid changes in these charges (caused by lightning etc.) it will contribute towards the protection of the cables 1, 2 and 3, owing to the arrangement on the terminals of the primary windings of the transformers 6, of lightning arresters 14 or of equivalent devices. The feed voltage of the transformers 6 being of a much lower order of magnitude than that adopted for the high-tension cable, the potential of the auxiliary cable 5 in relation to earth will thus be limited to an admissible value.

In Figure 2 the auxiliary cables 4 and 9 have been provided and these are earthed direct and there is also an auxiliary cable 5, supported on the insulators 8, the primary of the transformer 6 being connected between this cable and one of the earthed cables. If the cable 5 is symmetrically arranged in relation to the conductor cables 1, 2, and 3, the electrostatic action resulting from these can be too low to ensure a suitable feeding of the transformers 6. The potential between the cable 5 and the earth cable 4 can then be fixed by means of the secondary 15 of a transformer whose primary 16 is fed from a source which is placed for example in a sub-station of the system and which can if necessary be of a different frequency (notably a higher frequency) than the main system. It is understood that the use of such a transformer is equally possible in the arrangement according to Figure 1. In any case, the addition of transformers such as 15, 16 allow of nocturnal lighting even if the conductors 1, 2 and 3 are not electrically charged, for example while repairs are being carried out.

Evidently it is also possible to adopt numerous alternative embodiments without departing from the scope of the invention as set forth in the appended claim.

What I claim is:

The combination with a high potential transmission line system, of a continuous auxiliary conductor and a continuous ground wire, both paralleling the transmission line system and positioned in the electric field of said system, above it, in such manner as to be able to play the part of a Faraday cage for it, and, connected between the auxiliary conductor and the ground wire, respectively, lighting devices disposed at intervals along the auxiliary conductor, means, distinct from said transmission line system, for supplying with electrical energy of low voltage, said lighting devices from a given point of said auxiliary conductor, the parallel impedance of the assembly connected between the auxiliary conductor and the ground wire being selected of such low value that, under normal operating conditions, the voltage between the ground wire and the auxiliary conductor is substantially made equal, even when static charges are collected by the latter, to that which results from the E. M. F. of the supplying means, and arcing gaps adapted to operate at a voltage but a little higher than said last voltage, so as to protect the lighting devices against accidental overvoltages, and consequently, to enable under lightning surges, said auxiliary conductor to behave with regard to said ground wire and to said system substantially as a directly grounded wire.

JOSEPH BETHENOD.